United States Patent [19]
Friswell et al.

[11] Patent Number: 5,980,593
[45] Date of Patent: Nov. 9, 1999

[54] SILENT FLUORESCENT PETROLEUM MARKERS

[75] Inventors: Michael R. Friswell; Alejandro Zimin, Sr., both of Wayne; Peter A. Caputo, South Orange, all of N.J.

[73] Assignee: Morton International, Inc., Chicago, Ill.

[21] Appl. No.: 09/023,729

[22] Filed: Feb. 13, 1998

[51] Int. Cl.$^6$ ............... C10L 1/18; C09D 5/00; C09D 11/00; C07D 11/02
[52] U.S. Cl. ............ 44/349; 106/31.15; 252/301.16; 252/301.34; 549/285
[58] Field of Search ............ 44/349; 106/31.15; 252/301.16, 301.34; 549/285

[56] References Cited

U.S. PATENT DOCUMENTS

| | | | |
|---|---|---|---|
| 2,392,620 | 9/1946 | Sparks | 250/71 |
| 2,535,058 | 3/1950 | Gleim | 44/63 |
| 2,786,065 | 3/1957 | Eisenhauer et al. | 549/285 |
| 2,843,495 | 11/1958 | Chenicek | 99/163 |
| 4,009,008 | 2/1977 | Orelup | 44/59 |
| 4,209,302 | 6/1980 | Orelup | 44/59 |
| 4,735,631 | 4/1988 | Orelup | 44/59 |
| 5,156,653 | 10/1992 | Friswell et al. | 44/328 |
| 5,205,840 | 4/1993 | Friswell et al. | 44/428 |

FOREIGN PATENT DOCUMENTS 9012886  11/1990  WIPO.

OTHER PUBLICATIONS

Roberts, I.M., *Hydrolysis of 4–Methylumbelliferyl Butyrate: A Convenient and Sensitive Fluorescent Assay for Lipase Activity,* Lipids, vol. 20, No. 4, 243–247 (1985).
IP Standard Test Method 374, *Determination of Coumarin Content of Kerosine,* 374.1–374.4 (1992).

*Primary Examiner*—Jerry D. Johnson
*Attorney, Agent, or Firm*—Steven C. Benjamin; Gerald K. White

[57] ABSTRACT

Liquid petroleum products and industrial liquids are marked with highly soluble silent fluorescent markers having the formula:

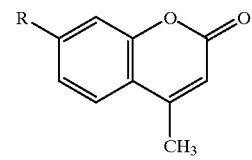

where R is selected from a linear or branched $C_1$–$C_{18}$ alkylcarboxy radical.

24 Claims, No Drawings

SILENT FLUORESCENT PETROLEUM MARKERS

FIELD OF THE INVENTION

This invention is directed to the tagging of petroleum products, such as fuels, and various other industrial products with silent markers and to the detection of such markers.

BACKGROUND OF THE INVENTION

It is well known to tag petroleum fuels, such as gasoline, diesel fuel, heating oil, kerosene, etc., with dyes and markers (collectively referred herein as "taggants"), as for example, as taught in U.S. Pat. Nos. 4,009,008; 4,209,302; and, 4,735,631 (all of Orelup), the teachings of each of which are incorporated by reference.

The need to tag fuels to distinguish them from otherwise identical but unmarked products exists for a number of reasons. It primarily arises from the differing price or tax structures of different grades of fuel or even of the same fuel used for different purposes. For example, diesel fuel used for off-highway non-vehicular purposes, such as mining, lumbering or fishing, is commonly taxed at lower rates than for highway vehicular use. Further, certain grades of oil are used interchangeably for heating oil or diesel fuel, while heating oil is commonly taxed much less. These situations can lead to cheating by unscrupulous persons who purchase lower taxed fuels and substitute or blend them together with higher taxed fuels to avoid the payment of higher taxes. In an effort to thwart these tax evaders, it is common for governments to require tagging of lower taxed fuels to provide field inspectors with the means to identify them from similar fuels subject to higher taxes. Certain fuels are also tagged to deter fraudulent adulteration of higher priced premium grade products with lower priced products, such as by blending kerosene, stove oil, or diesel fuel into regular grade gasoline or blending regular grade gasoline into premium grade gasoline.

Aside from price and tax matters, identification of particular production batches of bulk liquids for protection against theft is another valuable function of taggants, particularly for identifying fuels owned by large government, military or commercial consumers. Fuels are also dyed to provide visually distinguishable brand and grade denominations for commercial and safety reasons. Finally, marketers of brand name products in many industries use taggants to detect substitution of products of others in their distribution system and product adulteration, or to identify their brand name products from others', particularly when subjected to product warranty, product liability, and toxic waste claims.

It is, of course, necessary for the added taggant, whether dye or chemical marker, to be capable of quick and relatively simple identification by non-scientific field personnel. Dyes are the easiest of the taggants to detect, since identification is dependent simply upon color recognition by visual inspection. A "dye" is defined herein as a material lending visible color when dissolved in the dyed product. Examples of dyes which have been employed for coloring petroleum fuels, include C.I. Solvent Red 24, C.I. Solvent Red 19, C.I. Solvent Yellow 14, C.I. Solvent Blue 36, and C.I. Solvent Green 3.

Yet, dyes alone are not always adequate to securely and reliably identify fuels. Many dyes are easily removed by unauthorized persons to evade taxation. For instance, in those countries where tax laws provide that a lightly taxed heating oil be dyed a specific color, one form of deception is to decolorize the lower priced colored heating oil with common absorbents, such as charcoal, carbon black, and various clays, and then sell the colorless product as higher priced diesel fuel. Furthermore, dyes can be obscured by natural substances or additives present in the fuels, particularly when present at low concentrations in a mixture of fuels. Because dyes alone have these shortcomings, a combination of a dye and a marker, a marker alone, or multiple markers which do not obscure each other are often used to tag fuels.

A "marker" is defined herein as a substance which can be dissolved in a liquid to be identified in visually undetectable quantities, and then subsequently detected by performing a simple chemical or physical test on the tagged liquid. Markers that have been proposed include radioactive substances, fluorescent substances, and a variety of lightly colored or virtually colorless compounds which react with selected agents to provide intensely colored derivatives. Radioactive markers, in particular, have not gained wide acceptance due to the necessity for special equipment and handling measures to prevent harmful physiological disturbances to personnel. Regarding the visible color developable markers, the ones traditionally employed include furfural, quinizarin, diphenylamine, various naphthol derivatives, diazo compounds, phenylazophenols, etc. Specific examples and detection methods therefore can be found in the Orelup patents previously incorporated and also in U.S. Pat. Nos. 5,156,653 (Friswell et al.) and 5,252,106 (Hallisy), the teachings of each of which are incorporated by reference.

Regarding the fluorescent markers, they have a number of advantages over the other markers. For instance, they are environmentally friendly and relatively safe to handle, in comparison to radioactive substances. They also exhibit improved light fastness and, therefore, last much longer in the tagged product than color developable markers which fade much quicker. Moreover, fluorescent markers are truly "silent" when mixed with the tagged product and upon later detection. The term "silent" as used herein means that at the levels at which the markers are used, they impart virtually no visible coloration to the tagged product, and which, upon detection, fluoresce rather than undergo a visible color producing reaction. Thus, in all phases of use, they are visually undetectable to the naked eye under normal lighting conditions, even with commonly employed reactive extraction systems, making misuse or dilution of a tagged petroleum product almost impossible. The silent nature makes them desirable for use in non-dyed products. They are suitable as well in dyed products, since the markers do not alter the color imparted by the dyes.

Furthermore, fluorescent markers can provide quantitative determinations of the extent of adulteration. Most markers are adequate for detection qualitatively of their presence in petroleum product; however, many available markers do not provide a good quantitative measurement of their levels in liquid petroleum products. Quantitative determinations are particularly important in cases where dilution is suspected, e.g., dilution of a higher-taxed fuel with a lower-taxed fuel. With fluorescent markers, quantitative determinations may be done by matching the intensity of fluorescence given off by the sample being tested with a set of standards which will indicate approximately the degree of dilution or adulteration.

Yet, because the currently proposed fluorescent markers also suffer from shortcomings, they only have limited use in fuels. Exemplary of the current alkali extractable fluorescent markers is coumarine (1,2-benzopyrone) which is commonly used to tag kerosene. U.S. Pat. No. 2,392,620

(Sparks) discloses certain other fluorescent coumarine derivatives, such as umbelliferone (7-hydroxycoumarin) and 4-methylumbelliferone (7-hydroxy-4-methylcoumarin), for use as petroleum markers. Such coumarine based markers all suffer from having extremely poor fuel solubility, which makes them less than ideal for tagging bulk liquids.

In general, users of petroleum markers prefer markers that are provided in concentrated liquid form in either a petroleum product or a petroleum-miscible solvent. This allows for use of existing storage tanks, pipeline and metering equipment. The liquid form further encourages rapid and complete marker dissolution in the petroleum product to be tagged. Yet, the poor fuel solubility of the currently proposed coumarine based markers (i.e., generally of the order of magnitude of less 0.1% in commonly used petroleum solvents) means that they must be transported and used in dry state which creates attendant handling problems due to dusting and difficulties in metering. Furthermore, the poor fuel solubility precludes the possibility of providing highly concentrated solutions in petroleum or petroleum-miscible solvents containing about 20 wt. % or more active marker. The use of relatively dilute marker solutions requires handling, storage and metering of large volumes to mark a given volume of fuel, a situation which is highly undesirable from an economic point of view.

It would be desirable and is, therefore, an object of the present invention to provide silent fluorescent markers based on coumarine derivatives which are highly soluble in petroleum fractions and petroleum-compatible solvents, and which can be provided in a stable highly concentrated liquid form and readily used to tag industrial liquid products and petroleum fuels.

The article Roberts, I. M., *Lipids* 20: 243–247 (1985), discloses a fluorescent medical assay to screen for lipase activity which is essential to normal fat digestion in physiological systems. The assay employs certain linear fatty acid esters of 4-methylumbelliferone, namely 4-methylumbelliferone butyrate or 4-methylumbelliferone palmitate. None of these compounds are disclosed to be useful as markers for industrial liquids or petroleum fuels.

SUMMARY OF THE INVENTION

In accordance with the present invention, industrial and petroleum products, are tagged with a silent fluorescent marker of the general class of chemicals described as linear or branched chain alkyl acid esters of 7-hydroxy-4-methylcoumarin (4-methylumbelliferone).

More particularly, it is the linear or branched $C_1$–$C_{18}$ alkyl acid esters that are especially desirable, with the branched $C_5$–$C_{10}$ alkyl acid esters being even more preferred. Markers at levels of about 0.25 parts per million (ppm) or above (usually at least about 1 ppm) are added to liquid petroleum products. Since these markers have relative high solubilities in organic liquids, such as petroleum and petroleum-miscible solvents, they advantageously can be added as concentrated liquids, rather than pure solid compounds, to the liquids to be tagged. The markers may be detected in the products by extraction with an alkaline aqueous solution. This alkaline aqueous solution not only extracts the marker from the tagged product, but causes the marker to react and fluoresce, which when tested under a suitable source of light identifies the product as to source, permitted use, etc.

The present invention further provides novel compounds and novel highly concentrated liquid solutions of such compounds that are particularly suitable as markers for industrial and petroleum products.

DETAILED DESCRIPTION OF CERTAIN PREFERRED EMBODIMENTS

The markers of the present invention have the general formula:

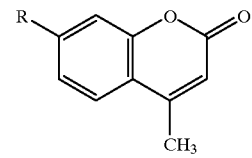

where the R is a radical selected from a linear or branched $C_1$–$C_{18}$ alkylcarboxy, preferably a linear or branched $C_5$–$C_{10}$ alkylcarboxy, most preferably a branched $C_8$ alkylcarboxy.

These compounds are conveniently synthesized by esterification of an appropriately selected linear or branched $C_1$–$C_{18}$ alkyl carboxylic acid, preferably a $C_5$–$C_{10}$ alkyl carboxylic acid, or acid halides thereof, such as acid chlorides, with 7-hydroxy-4-methylcoumarin. Esterification can be carried out by standard techniques well known in the art. Examples of suitable linear alkyl carboxylic acids (or acid halides) useful herein include, without limitation, n-hexanoyl chloride, n-octanoyl chloride, and the like. Examples of suitable branched alkyl carboxylic acids (or acid halides) useful herein include, without limitation, 2-methyl propanoyl chloride, 2-ethyl hexanoyl chloride, and the like, with 2-ethyl hexanoyl chloride being most preferred. It should be understood that whether acids or acid halides are listed above, any of these forms are contemplated for use herein.

In this invention, the $C_5$–$C_{10}$ alkyl carboxylic acids are particularly preferred due to easier detection in fuels as a result of reduced interference from background fluorescence. Branched acids are also highly preferred due to their relatively higher solubility in organic liquids, such as petroleum fractions and petroleum-miscible solvents. Those skilled in the art will understand that the alkyl acids may be substituted or unsubstituted. It should also be understood that carboxylic acids other than alkyl acids may be used to form the ester moiety, with R then being a linear or branched, $C_1$–$C_{18}$, substituted or unsubstituted, arylcarboxy, arylalkylcarboxy, cycloalkylcarboxy, alkenylcarboxy radical, or the like, although markers formulated with the above alkyl acids and having the above general formula are most preferred.

Due to the presence of the ester moiety, the markers of the above general formula display a surprisingly high solubility in organic liquids, such as petroleum fractions and petroleum-miscible solvents, in comparison to the currently available coumarine based fluorescent markers which are relatively fuel insoluble. Due to the high fuel solubility, the markers of the present invention can now be provided as stable homogeneous concentrated liquid solutions in petroleum fractions or petroleum-miscible solvents, which have the most commercial utility for the above mentioned reasons.

A wide variety of solvents can serve as the liquid carrier for the markers of the above general formula. Examples of suitable solvent carriers include, without limitation, non-ionic surfactants, such as aromatic, aliphatic, and ethoxylated nonyl phenols, such as Igepal CO-720 sold by Rhone Poulenc, and the like. Other suitable solvent carriers are organic solvents including, without limitation, aromatic hydrocarbons, such as toluene and xylene, various petroleum fractions, fatty alcohols, such as n-hexyl alcohol, and pyrrolidones, such as n-methyl-2-pyrrolidone, and the like. Still other suitable solvents will be apparent to those skilled in the art depending on the particular end-use application.

Those skilled in the art will further understand that concentrations will vary depending on the particular end-use application. Stable homogenous liquid solutions in the aforesaid carriers have been achieved at concentrations ranging from about 1 to about 80 wt. % active marker without the marker falling out of solution. Petroleum markers, in particular, are desirably provided in highly concentrated solutions, e.g., 20 wt. % or above. These concentrated liquid solutions are miscible with the petroleum fractions in all proportions and disperse within the petroleum products rapidly. Such liquids are also easily metered into a pipeline or storage tank at any dosage rate desired.

While the major advantage of the compounds of this invention is high fuel solubility, the compounds of the general formula above have a number of other desirable characteristics. For instance, these compounds are generally colorless and at the end use levels, e.g., 0.25–100 ppm, in for example a petroleum product, do not impart any color to the fuel or otherwise indicates their presence to the naked eye. On the other hand, when extracted from petroleum in alkaline aqueous solution, they produce extracts that strongly fluoresce blue when tested under a suitable source of light, such as an ultraviolet light emitting at a 365 nm wavelength. Although it is true that certain petroleum products contain naturally fluorescing materials which could mask or obscure the fluorescence of the markers of this invention or provide a false positive, upon extraction under alkaline conditions, the natural compounds generally do not fluoresce while the marker compounds do. Furthermore, while being present in fuels only in minute parts-per-million (ppm) quantities, the compounds of this invention are easily extracted from the fuel specimen being tested and detected by a simple on-site field test. They further have identities which can be confirmed by laboratory methods. In addition, they are stable at least over the anticipated storage life of the tagged fuels (usually three to six months) and due to their excellent light fastness usually last much longer.

The final amount of marker in a tagged liquid petroleum product will depend upon a variety of factors. It is generally necessary to have at least about 0.25 ppm in the finally tagged liquid petroleum product. Usually, however, a somewhat greater amount will be provided, e.g., 5–40 ppm, but seldom over 100 ppm, enabling the marker to be detected, should the tagged petroleum product be diluted with untagged petroleum product. In industrial applications, higher marker concentrations, e.g., 200–300 ppm, are not unusual. It is generally desirable to provide an amount of marker that might be detected in a simple field test. Of course, where sophisticated testing equipment is available, it may be possible to use even less marker.

Extraction of the marker from the tagged petroleum product for detection purposes may conveniently be carried out with solutions typically composed of 5–60 vol.% of a water-miscible, petroleum-immiscible bridging solvent, water, a mineral alkaline source, such as KOH, and/or an alkyl or alkoxy amine. Examples of suitable bridging solvents include, without limitation, alcohols, such as methanol and ethanol, glycols, such as ethylene glycol, diethylene glycol, polyethylene glycol and polypropylene glycol, pyrrolidones, such as n-methyl-2-pyrrolidone, and the like.

Although not wishing to be bound by theory, the alkali extractant is believed to hydrolyze the ester moiety, resulting in development of a coumarine extract, particularly 7-hydroxy-4-methylcoumarin, that highly fluoresces, and also changing the solubility of the marker so that it is substantially less soluble in petroleum and substantially more soluble in aqueous extraction medium and thus easily extracted into the aqueous phase.

As a simple field test, a suitable volume of the aqueous extractant mixture is mixed with a suitable volume of the liquid petroleum to be tested. Typically the volume ratio of extraction mixture to liquid petroleum is between about 1:1 and about 1:40. If marker is present in the petroleum product, it will be extracted by the aqueous layer and caused to fluoresce by reaction with the extraction mixture. A simple hand-held ultraviolet light source can be used to qualitatively detect the marker.

Another advantage of this invention is the simplicity of the qualitative test afforded by the markers and extraction/development solutions. Experience has indicated that inspectors in the field are often adverse to performing all but the most simple tests. The test as indicated above is a quick and simple test. Convenience can be enhanced by providing an inspector a pre-measured amount of extractant solution in an extraction vial and, preferably, means to measure an appropriate amount of petroleum product. For a rough estimate of marker level, the inspector might even be provided with a chart against which to compare the developed fluorescence intensity.

More sophisticated fluorometric equipment may also be used to quantify the amount of marker in the aqueous layer. As long as similar conditions, e.g., volume-to-volume, ratios are used for similar liquid petroleum products, the fluorescence that is produced is relatively quantitative. The test is not "quantitative" in the strict sense that exact levels of marker can be tested in tagged petroleum. This is due in large part to the nature of petroleum products which are mixtures of a wide variety of compounds. Depending upon the particular batch of petroleum product, the level of impurities extractable by the extraction solution may vary. However, in tests conducted according to the present invention, it is generally possible to determine marker levels to within about 5%.

In non-petroleum applications, such as where the markers are used to tag various solvent and water borne liquid coatings that form dry films after application, e.g., paints, floor finishes, and security inks used to print brand name labels, such as blue jean labels, a simple surface spot test may be used to determine positive source identification of the product rather than using the above extraction methods. In this method, an alkali developing solution is applied over a small area of the product and then passed under an ultraviolet light for detection of fluorescence. The spot test area will appear unaffected under normal lighting and not disturb the visual appearance of the tested area. Other end-use applications can include tagging cement mixes, asphalt mixes, powder coatings, etc.

The invention will now be described in greater detail by way of specific non-limiting examples. All parts and percentages specified herein are by weight unless otherwise stated.

EXAMPLE 1

Preparation of 2-Ethyl Hexanoic Acid Ester of 7-Hydroxy-4-Methyl Coumarine

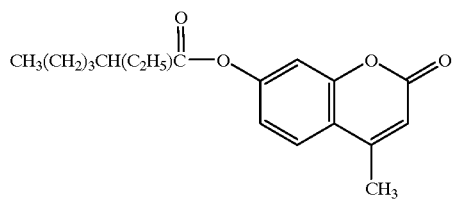

To a 2 liter flask, a reaction mixture of 55 g (0.5 mole) resorcinol, 71.5 g (1.3 mole) ethyl acetoacetate, 200 g xylene, and 10 g Amberlyst 15 (Rohm and Haas) ion exchange resin catalyst was charged. With heating to a strong reflux at 110–130° C., a Von Pechman condensation reaction was carried out between resorcinol and ethyl acetoacetate to yield 7-hydroxy-4-methyl coumarine product.

When the reaction was complete (no water of condensation in azeotrope), the product was then reacted in the same flask with excess 2-ethyl hexanoyl chloride at a molar ratio of 1 to 1.3. With heating to a gentle reflux at 105° C., an esterification reaction was carried out and the final product was formed. Upon completion of the reaction (no more exotherm), the organic layer was cooled, washed free of excess hydrochloric acid, stripped from xylene, and filtered and dried. The 156 g ester residue isolated was a colorless wax-like semi-solid material. The yield was determined to be about 88–92% of theoretical.

The ester product isolated formed a stable 33 wt. % marker solution in xylene, a petroleum-miscible solvent.

EXAMPLE 2

Extraction of Compound Prepared in Example 1 from Fuel 0.3 ppm of the 33% marker solution of Example 1 was dissolved in isooctane to tag the fuel. Thereafter, the marker was extracted with 1 part alkaline aqueous extractant and 2 parts marked fuel. When the extractant portion of the mixture was isolated and tested under a U.V. lamp (365 nm), a deep blue fluorescent glow was obtained indicating the presence of the marker.

EXAMPLE 3

Spot Test Detection of Compound Prepared in Example 1 in Dried Floor Finish

Two liquid floor finishes, one being a urethane and the other being an acrylic, were each marked at a level of 0.1 wt. % with a liquid fluorescent marker solution known as Mortrace™ 20169 (33% marker of Example 1 in Igepal CO-720) and used to coat six different types of floor boards. No visible effect was observed on the floor finishes tested, nor was there evidence of precipitation or separation after one week of storage. The coated wood panels were submitted to ambient light and temperature conditions for about 6 months and then checked for a positive result. The test method used was a simple drop test using alkaline aqueous extractant. After the drop was allowed to penetrate the surface area contacted (approximately 10 minutes), a fluorescent light was used to observe the resulting bright blue fluorescent dot in all coated wood panels.

EXAMPLE 4

Spot Test Detection of Compound Prepared in Example 1 in Dried Paint

A latex flat paint was marked with of 0.1 wt. % of Mortrace™ 20169 marker as described in Example 3. The marker did not add any background color to the paint, nor did it show any signs of precipitation or separation. After the paint was coated onto a aluminum foil substrate and allowed to dry, a drop of alkaline aqueous extractant was applied onto and allowed to penetrate the substrate for about 10 minutes. Then the substrate was exposed to a fluorescent light which revealed a bright blue spot indicating presence of the marker.

EXAMPLE 5

Spot Test Detection of Compound Prepared in Example 1 in Brand Name Labels

An invisible, i.e., clear, security ink for ink jet printing was prepared from a mixture of 10% n-propanol, 5% propylene glycol, 8.3% alkaline water soluble styrene-acrylic resin, 1% Mortrace™ 20166 marker (33% marker of Example 1 in Aromatic 200 Solvent), and balance water. After being filtered through a 5 micron bag, the ink was observed for any signs of precipitation. After about 10 days, a slight ring of precipitate was noticed which would require some further ink improvement to assure proper ink stability. In any event, the marker added no background color to the ink. After the ink was printed onto a porous substrate and allowed to dry, a felt tip marker containing the alkaline aqueous extractant was moved across a small area of the dried ink and allowed to penetrate the substrate for about ten minutes. Then the substrate was exposed to a fluorescent light which revealed a bright blue spot indicating the presence of the marker. This ink may be formulated with up to 5% Aquamate® dye to impart the desired color to the ink for printing brand labels.

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. A composition comprising a liquid product selected from the group consisting of paints, coatings, inks, and petroleum products, and a detectable level of a marker having the formula:

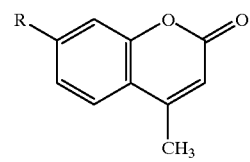

where R is selected from a linear or branched $C_1$–$C_{18}$ alkylcarboxy radical.

2. The composition according to claim 1 wherein said liquid product is a petroleum product.

3. The composition according to claim 1 wherein said marker is present at a level of at least about 0.25 ppm.

4. The composition according to claim 1 wherein R is selected from a linear or branched $C_5$–$C_{10}$ alkylcarboxy radical.

5. The composition according to claim 1 wherein R is a branched $C_8$ alkylcarboxy radical derived from 2-ethyl hexanoyl chloride or its corresponding acid.

6. The composition according to claim 1 wherein said marker is provided as a concentrated liquid solution which comprises about 20 wt. % or more marker and the balance petroleum-miscible liquid carrier.

7. The composition according to claim 6 wherein said liquid carrier is selected from the group consisting of ethoxylated nonyl phenols, aromatic hydrocarbons, and petroleum fractions.

8. The composition according to claim 1, wherein the marker is present at a level unobservable to the naked eye.

9. A method of marking a liquid product selected from the group consisting of paints, coatings, inks, and petroleum products, comprising adding to said liquid product a detectable level of a marker having the formula:

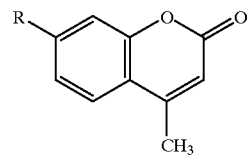

where R is selected from a linear or branched $C_1$–$C_{18}$ alkylcarboxy radical.

10. The method according to claim 9 wherein said liquid product is a petroleum product.

11. The method according to claim 9 wherein said marker is added at a level of at least about 0.25 ppm.

12. The method according to claim 9 wherein R is selected from a linear or branched $C_5$–$C_{10}$ alkylcarboxy radical.

13. The method according to claim 9 wherein R is a branched $C_8$ alkylcarboxy radical derived from 2-ethyl hexanoyl chloride or its corresponding acid.

14. The method according to claim 9 wherein said marker is added as a concentrated liquid solution comprising about 20 wt. % or more marker and the balance petroleum-miscible liquid carrier selected from the group consisting of ethoxylated nonyl phenols, aromatic hydrocarbons, and petroleum fractions.

15. The method according to claim 9, wherein said marker is added at a level unobservable to the naked eye.

16. A liquid marker solution, comprising a petroleum-miscible liquid carrier and a compound having the general formula:

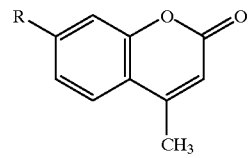

where R is selected from a linear or branched $C_1$–$C_{18}$ alkylcarboxy radical.

17. The solution according to claim 16 wherein R is selected from a linear or branched $C_5$–$C_{10}$ alkylcarboxy radical.

18. The solution according to claim 16 wherein said petroleum-miscible liquid carrier is selected from the group consisting of ethoxylated nonyl phenols, aromatic hydrocarbons, and petroleum fractions.

19. The solution according to claim 16 wherein said marker comprises about 20 wt. % or more of said solution and balance carrier.

20. A fluorescent marker composition having the formula:

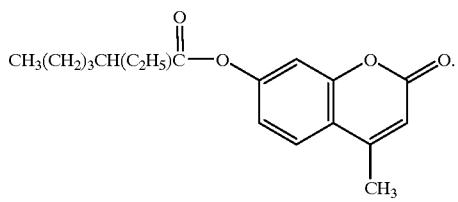

21. A fluorescent marker composition comprising the reaction product of 7-hydroxy-4-methylcoumarin and 2-ethyl hexanoyl chloride or its corresponding acid.

22. A method of identifying a liquid product selected from the group consisting of paints, coatings, inks, and petroleum products, comprising:

a) providing a liquid product selected from the group consisting of paints, coatings, inks, and petroleum products, having incorporated therein a detectable level of a marker having the formula:

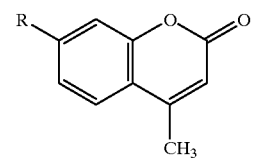

wherein R is selected from a linear or branched $C_1$–$C_{18}$ alkylcarboxy radical; and, b) subsequently identifying the so marked product by extracting said marker from said product with an alkaline aqueous extractant, and observing the fluorescence of said marker in said extractant under a suitable light source.

23. The method according to claim 22, wherein said liquid product is a petroleum product.

24. The method according to claim 22, wherein said marker is incorporated in said liquid product at a level unobservable to the naked eye.

* * * * *